United States Patent [19]

Gerlinger

[11] 4,245,457
[45] Jan. 20, 1981

[54] HAYMAKING MACHINE

[75] Inventor: Frédéric Gerlinger, Ottersthal, France

[73] Assignee: Kuhn, S.A., Saverne, France

[21] Appl. No.: 966,556

[22] Filed: Dec. 5, 1978

[30] Foreign Application Priority Data

Dec. 16, 1977 [FR] France ............... 77 38721

[51] Int. Cl.³ .......................................... A01D 79/00
[52] U.S. Cl. ........................................ 56/370; 56/367
[58] Field of Search ............... 56/365, 366, 367, 370

[56] References Cited

U.S. PATENT DOCUMENTS

| 3,896,613 | 7/1975 | van der Lely | 56/370 |
| 3,910,019 | 10/1975 | Schlittler | 56/367 |
| 3,948,028 | 4/1976 | Reber | 56/365 |

FOREIGN PATENT DOCUMENTS 2245274  7/1973  France ........................... 56/367

Primary Examiner—Robert A. Hafer
Attorney, Agent, or Firm—Young & Thompson

[57] ABSTRACT

The disclosure is of a haymaking machine with two or more rake heads, a chassis, and a beam, and also means which automatically and simultaneously cause a pivoting of the chassis of the rotary rake heads about a substantially horizontal spindle of a pivot when the said chassis is pivoted about a substantially vertical spindle of the said pivot to modify its orientation in relation to the direction of travel of the machine when the latter is changed from the central tedding position into the lateral windrowing position and vice versa.

8 Claims, 6 Drawing Figures

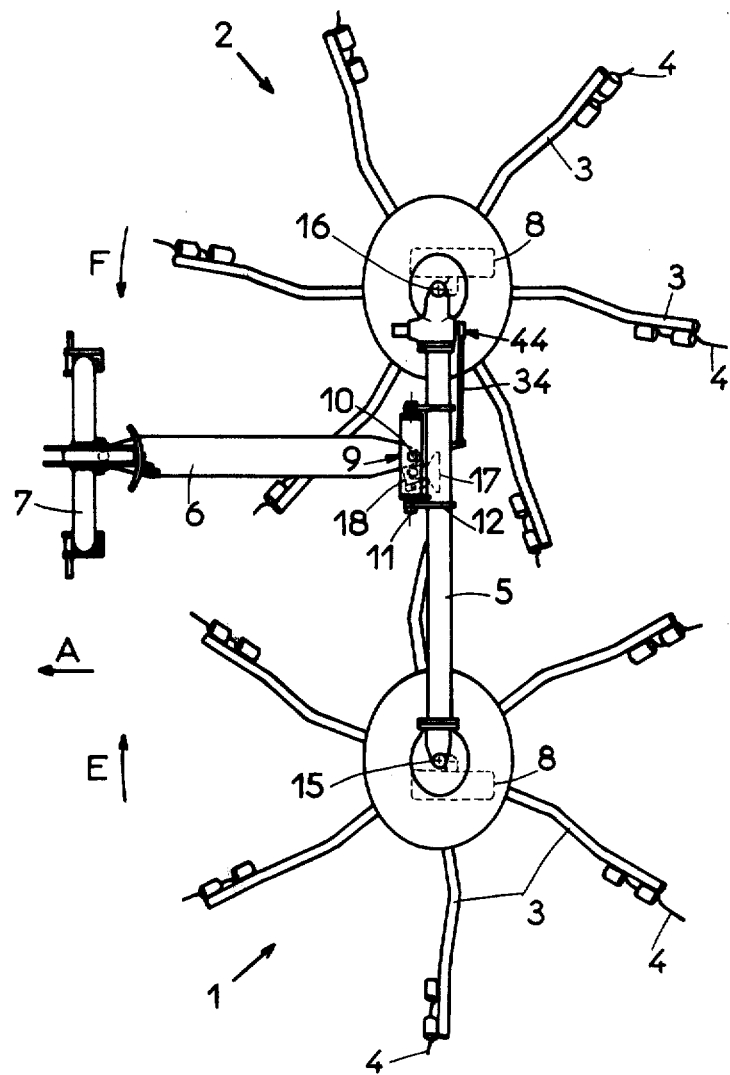

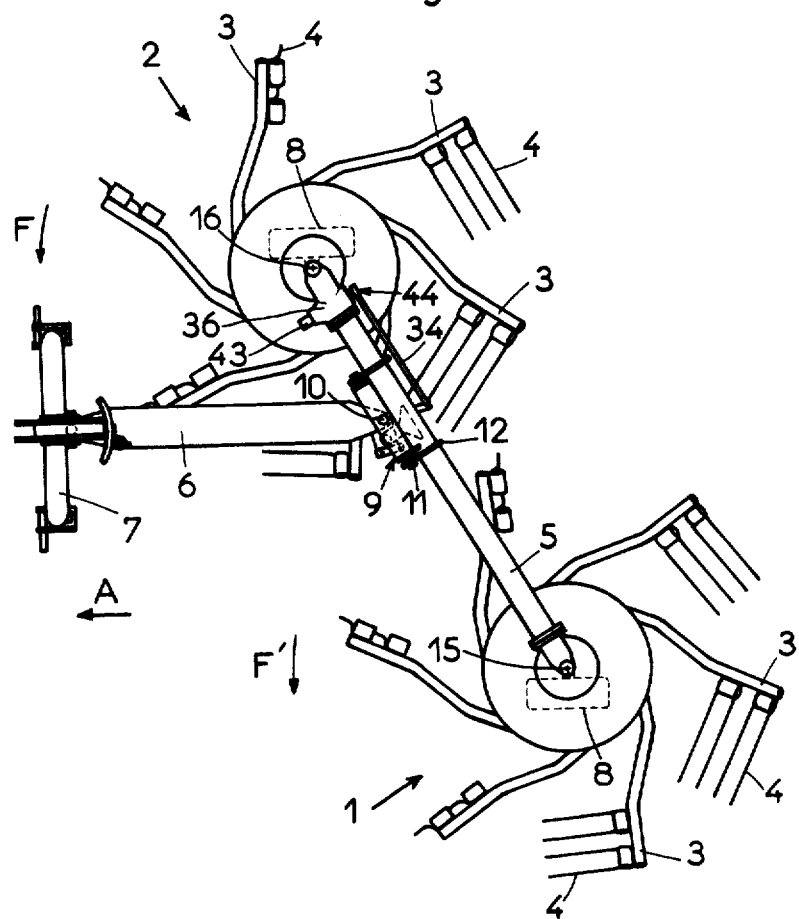

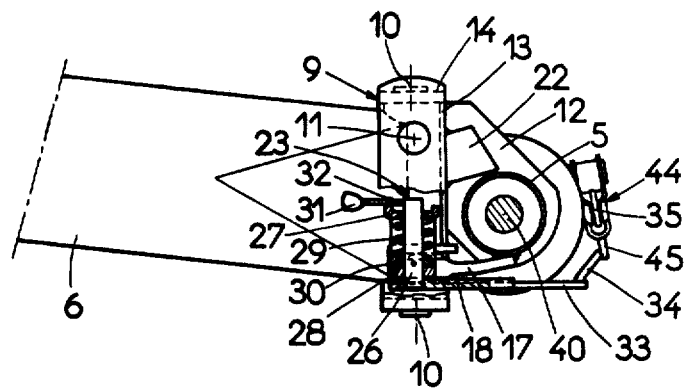
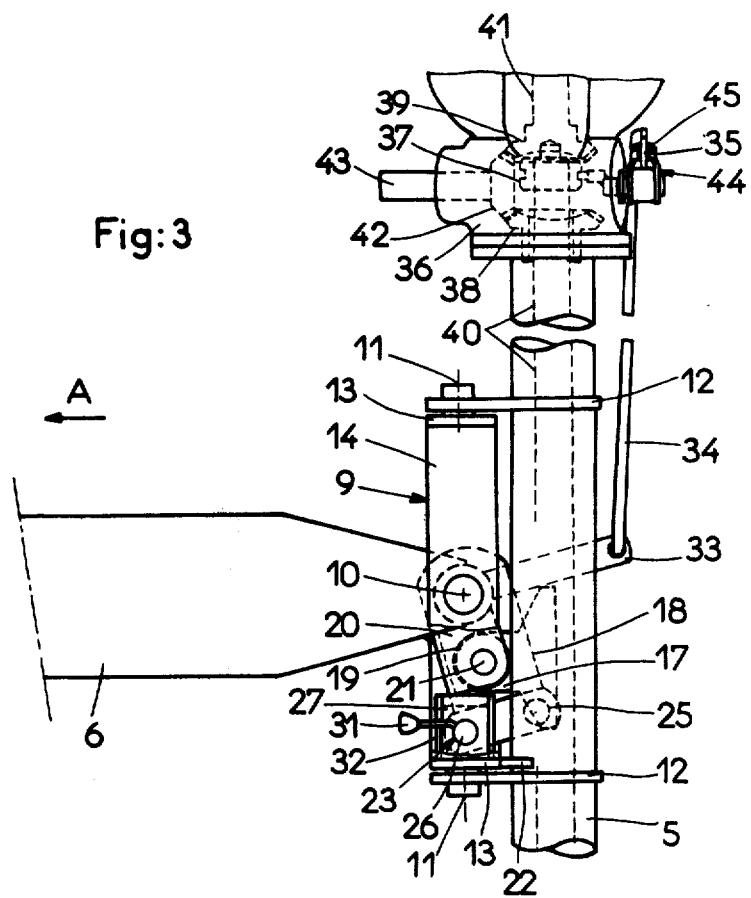

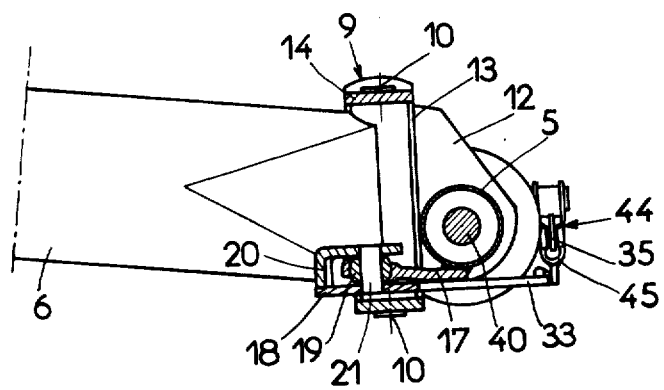
Fig: 6
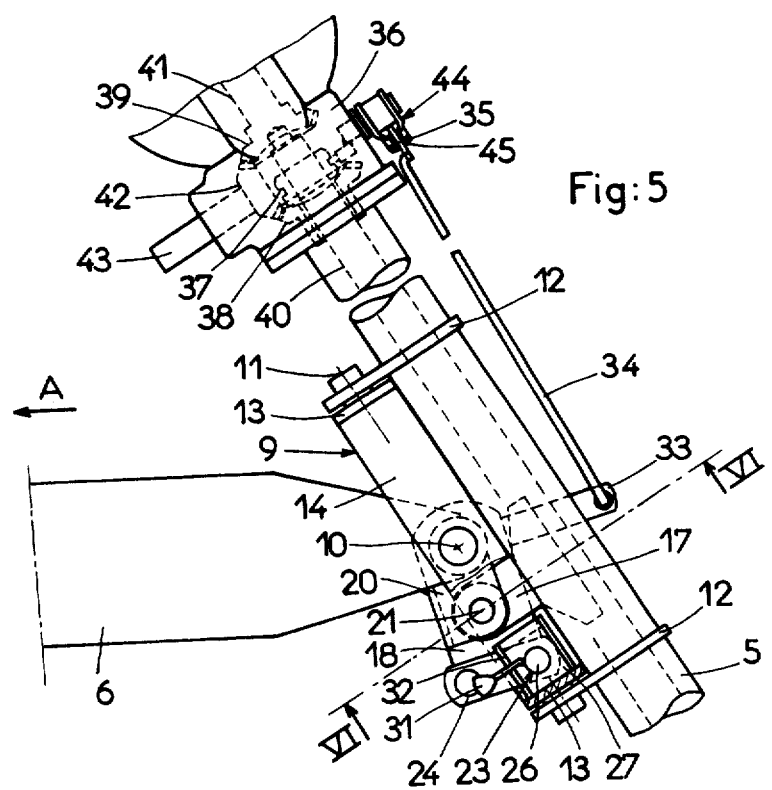
Fig: 5

HAYMAKING MACHINE

INTRODUCTION AND BACKGROUND OF THE INVENTION

The present invention relates to combined haymaking machines for central tedding and lateral windrowing, comprising at least two rotary rake heads interconnected by means of a support chassis which is connected to a forwardly directed connection beam through the intermediary of a pivot which is connected to the said connection beam by means of a substantially vertical spindle and to the support chassis by means of a spindle which is substantially horizontal and substantially parallel to the said support chassis.

The transposition of such machines from the central tedding position into the lateral windrowing positon or vice versa necessitates a multitude of adjustments representing a significant loss of time for the user. In fact it is necessary especially:

- to modify the orientation of the support chassis of the rotary rake heads in relation to the direction of travel of the machine,
- to orient the wheels carrying the rotary rake heads into the direction of travel of the machine,
- to reverse the direction of rotation of at least one of the rotary rake heads,
- to modify the position and/or the controlling of the working tools of the rotary rake heads, to modify the inclination of the rotation axes of the rotary rake heads in relation to the ground.

In view of the large number of these adjustments it can occur that one or more of them may be effected badly or only partially or even omitted, which would be detrimental to the quality of the work and could furthermore cause significant damage to the machines.

In my U.S. Pat. No. 4,175,369 a haymaking machine is described and claimed having an improved transposition device intended to remedy the above-stated drawbacks. For this purpose the said machine comprises especially means which automatically and simultaneously cause the rotation of the support chassis of the rotary rake heads about a substantially vertical axis in order to modify its orientation in relation to the direction of travel, when the inclination of the rotation axes of the rotary rake heads in relation to the ground is modified. This modification is effected by means of a control element which in that case is a threaded rod and the actuation of which causes the support chassis of the said rotary rake heads to turn about an axis parallel or coinciding with the longitudinal axis of the chassis. This arrangement however still necessitates the actuation of a control member, which can be the origin of poor adjustments.

The present invention aims especially at further simplifying and improving the transposition of combined haymaking machines as described in the introduction from the central tedding position into the lateral windrowing position and vice versa.

BRIEF SUMMARY OF THE INVENTION

To this end, one important characteristic of the invention consists in that the machine comprises means which automatically and simultaneously cause a pivoting of the support chassis of the rotary rake heads about the substantially horizontal axis of the pivot, with the purpose of regulating the inclination of the rotation axes of the said rotary rake heads in relation to the ground, when the said support chassis is pivoted about the substantially vertical axis of the said pivot in order to modify its orientation in relation to the direction of travel of the machine, in the transposition from the central tedding position into the lateral windrowing position and vice versa.

The said means are constituted especially by a connection arm which is fast with the support chassis of the rotary rake heads and is pivoted on a plate fast with the connection beam, by means of a ball joint. This connection arm is displaced in relation to the substantially vertical axis and to the substantially horizontal axis of the pivot.

With the means in accordance with the present invention the manner of procedure reverse to that described in the above-mentioned patent is adopted for transposing the machine from one working position into the other.

FURTHER DESCRIPTION AND ADVANTAGES OF THE INVENTION

In fact, with the device according to the present invention a slight traction of pressure is exerted upon the support chassis of the rotary rake heads to modify its orientation in relation to the direction of travel, which modification simultaneously and automatically causes the regulation of the inclination of the rotation axes of the rotary rake heads in relation to the ground. Furthermore the pivoting of the support chassis about the substantially vertical axis of the pivot is executed almost automatically, in particular when the machine can be lifted from the ground by means of the hydraulic lift device of the tractor. This manner of procedure has the advantage especially of not requiring any regulation by means of any control member which might be effected more or less well by the user of the machine.

The above-mentioned pivot, either directly or in combination with a stop attached to it, forms advantageously an arresting device limiting the pivoting of the support chassis in the transposition of the machine into the lateral windrowing position and into the central tedding position.

Thus the said chassis is immobilised automatically as soon as it reaches the appropriate position for the desired work. Furthermore in each of these positions the support chassis of the rotary rake heads can be locked by means of a spring bolt. The connection beam can furthermore comprise, at its extremity directed towards the support chassis of the rotary rake heads a lever which is connected to a link rod which is itself connected to a control lever causing the reversal of the direction of rotation of at least one of the rotary rake heads when the support chassis pivots about the substantially vertical axis of the pivot in order to be brought from the central tedding position into the lateral windrowing position and vice versa. In this case the said pivoting of the support chassis of the rotary rake heads about the substantially vertical axis of the pivot simultaneously and automatically causes the regulation of the inclination of the rotation axes of the rotary rake heads in relation to the ground and the reversal of the direction of rotation of at least one of the said rotary rake heads in such manner that when they are two in number they rotate in the same direction during windrowing and so as to converge at the front during central tedding.

3

The invention will be explained in greater detail hereinafter, with further characteristics and advantages, in a description of a form of embodiment of the invention given by way of non-limitative example with reference to the accompanying drawings, wherein:

BRIEF DESCRIPTION OF THE VIEWS IN THE DRAWINGS

FIG. 1 represents a plan view of a machine according to the invention in the central tedding position, FIG. 2 represents a plan view of a machine according to the invention in the lateral windrowing position, FIG. 3 represents a plan view on a larger scale of the transposition device according to the invention, with a partial section of the pivot, the machine being situated in the central tedding position, FIG. 4 represents a side view, partially in section, of the device as represented in FIG. 3, FIG. 5 represents a view similar to that in FIG. 3, the machine being situated in the lateral windrowing position, FIG. 6 represents a section along the line VI—VI in FIG. 5.

DETAILED DESCRIPTION OF THE PREFERRED EMBODIMENT

As shown in the drawings, the combined haymaking machine for central tedding and lateral windrowing comprises two rotary rake heads 1 and 2. Each of these rotary rake heads 1, 2 comprises several arms 3 which extend outwards and comprise at their extremities more remote from the centre of the corresponding rotary rake head working tools 4 such as tines, forks or analogous elements. The said rotary rake heads 1, 2 are interconnected by means of a support chassis 5. The latter is connected to a connection beam 6 which extends forward—considered in the intended direction A of travel of the machine—and permits the coupling of the machine to a propelling vehicle (not shown). For this purpose the connection beam 6 comprises at its forward extremity, as represented by way of no-limitative example in FIGS. 1 and 2, a hitch device 7 permitting the attachment of the machine to the three-point hitch device of the propelling vehicle. During working this machine can move over the ground by means of small support wheels 8 placed under the rotary rake heads 1, 2.

The above-mentioned connection between the support chassis 5 of the rotary rake heads 1, 2 and the connection beam 6 is effected through the intermediary of a pivot means 9. This is pivoted on the connection beam by means of a substantially vertical spindle 10 and on the support chassis by means of a spindle 11 which is substantially horizontal and substantially parallel with the support chassis. To this end the support chassis 5 comprises two lugs 12 substantially parallel with one another and directed upwards and in the intended direction A of travel of the machine. The pivot means 9 is especially constituted by a substantially U-shaped bar 13 having a crosspiece 14 connecting the upper extremities of the two spaced depending arms.

In the central tedding position as represented in FIGS. 1, 3 and 4, the support chassis 5 of the rotary rake heads 1, 2 extends substantially perpendicularly of the intended direction A of travel of the machine. The said rotary rake heads 1 and 2 are driven in rotation so as to rotate toward each other at the front in the directions of the arrows E and F about rotation axes 15 and 16 which are inclined forwardly by a small angle. Moreover the working tools 4 are situated in a position appropriate for the tedding work in which they remain in contact with the fodder over a significant part of their trajectory. Thus the fodder situated on the ground in front of the machine is contacted by the working tools 4 which move it to the area between the rotary rake heads 1 and 2 and then project it upwards and to the rear, causing its turning.

In the lateral windrowing position as represented in FIGS. 2, 5 and 6, the support chassis 5 of the rotary rake heads 1, 2 is placed obliquely in relation to the intended direction A of travel of the machine and the carrier wheels 8 are oriented in the said direction of travel. Moreover the rotary rake heads 1 and 2 are driven in rotation so as to rotate in the same direction which is indicated by the arrows F and F'. Their rotation axes 15 and 16 are substantially vertical. Furthermore the working tools 4 of the rotary rake heads 1 and 2 are situated in a position appropriate to windrowing in which they easily disengage themselves from the raked fodder in order to favour the formation of a windrow. To this end the tool-carrier arms 3 with their working tools 4 are controlled by known means such as a guide cam so that over a partial range of their trajectory the said working tools pivot upwards and in the direction opposite to the directions of rotation F and F' of the rotary rake heads 1 and 2. In this working position the foremost rotary rake head 2 deposits the fodder substantially in front of the rotary rake head 1 which moves said fodder laterally to form a longitudinally extending windrow.

From this description it appears clearly that the transposition of the machine from the central tedding position into the lateral windrowing position and vice versa necessitates a large number of adjustments. In order to simplify and improve the said transposition from one working position to the other, the machine according to the invention comprises means which automatically and simultaneously cause a pivoting of the support chassis 5 about the substantially horizontal articulation spindle 11 of the pivot means 9, when the support chassis is pivoted about the substantially vertical articulation spindle 10 of the pivot means in order to modify its orientation in relation to the intended direction A of travel of the machine. This pivoting about the substantially horizontal spindle 11 adjusts the inclination in relation to the ground of the rotation axes 15 and 16 of the rake heads 1 and 2. These means are especially constituted by a connection arm 17 fixed on the support chassis 5. The connection arm extends forward and is pivoted on a plate 18 fixed on the connection beam 6, by means of a ball joint 19 which permits the support chassis 5 to pivot in relation to the said connection beam. The plate comprises moreover an angled lug 20 with which it substantially forms a fork joint in which there engages the forward extremity of the connection arm 17 which comprises the ball joint 19. This fork joint and the ball joint 19 are connected a spindle 21 (see FIG. 6).

The connection arm 17 of the support chassis 5 is situated lower than the substantially horizontal spindle 11 of the pivot means 9 and on the part of the support chassis 5 which pivots to the rear about the substantially vertical spindle 10 of the pivot 9, in the transposition of the machine into the lateral windrowing position. Thus when the support chassis 5 is pivoted into the lateral windrowing position as represented in FIGS. 2 and 5, the connection arm 17 exerts a force upon the support chassis. This force causes the latter to pivot about the substantially horizontal spindle 11 with the pivot 9 in such manner that the rotation axes 15 and 16 of the rotary rake heads 1 and 2 approach a substantially vertical position which is suitable for windrowing work. When the rotation axes 15 and 16 reach the appropriate position for windrowing, the support chassis 5 abuts the pivot means 9. The latter thus constitutes a stopping device which determines the position of the rotary rake heads 1 and 2 during windrowing (see FIGS. 5 and 6). Conversely, when the support chassis 5 of the rotary rake heads 1 and 2 is pivoted about the substantially vertical articulation spindle 10 of the pivot means 9 to bring it into the central tedding position as represented in FIGS. 1 and 3, the connection arm 17 exerts a thrust upon the support chassis 5. This thrust then causes the latter to pivot about the substantially horizontal spindle 11 with the pivot means 9 so that the rotation axes 15 and 16 of the rotary rake heads 1 and 2 incline forward—seen in the intended direction A of travel of the machine. The pivot means 9 includes a stop 22 against which the support chassis 5 is immobilised when the rotation axes 15 and 16 of the rotary rake heads reach the appropriate position for tedding. The abutment 22 thus determines the position of the rotary rake heads 1 and 2 during tedding (see FIGS. 3 and 4).

The device as described above is particularly advantageous since the positions of the rotation axes 15 and 16 of the rotary rake heads 1 and 2 for tedding and for windrowing are obtained automatically and simultaneously with the orientation of the support chassis 5 in relation to the intended direction A of travel. Now as this orientation can be effected by exertion of a simple thrust or force upon the support chassis 5, there is no need to operate any control element for the transposition of the machine from one position to the other. Moreover, since the support chassis 5 of the rotary rake heads 1 and 2 is automatically immobilised in each of the working positions by virtue on the one hand of the pivot means 9 and on the other of the abutment 22, there is no risk of maladjustment.

The forward part of the connection arm 17 of the support chassis 5 of the rotary rake heads 1 and 2 is slightly angled upward by an angle substantially equal to half the value of the angle of pivoting of the support chassis 5 about the substantially horizontal spindle 11 of the pivot means 9, in the passage from one working position to the other. By virtue of this characteristic the angles which the forward part of the connection arm 17, which comprises the ball joint 19, forms with the plate 18 of the connection beam 6 and the lug 20 are very small in each of the working positions. These angles are equal to substantially to half of the afore-mentioned angle of pivoting of the support chassis 5.

The support chassis 5 of the rotary rake heads 1 and 2 can be locked in relation to the connection beam 6, both in the central tedding position and in the lateral windrowing position. This locking is effected by means of a spring bolt 23 disposed on the pivot means 9. This bolt 23 can engage in orifices 24 and 25 provided on the extension of the plate 18 fast with the connection beam 6. These orifices 24 or 25 correspond one to the central tedding position and one to the lateral windrowing position. The bolt 23 is composed especially of a spindle 26 which is guided in lugs 27 and 28 fast with the lateral part of the pivot means 9. Over its part between these two lugs the spindle is surrounded by a compression spring 29 which bears for the one part on the upper lug 27 and for the other part upon a washer 30 fast with the spindle 26. Thus this spring constantly thrusts the spindle 26 downwards and keeps it engaged in one of the orifices 24 or 25 for the locking of the support chassis 5. The spindle 26 comprises on its upper part a substantially horizontal operating lever 31 bearing against an oblique ramp 32 of the upper lug 27, under the action of the thrust of the spring 29. Thus by sliding of the lever upward on the oblique ramp 32, against the force of the spring 29, the spindle 26 is displaced upwards and frees the support chassis 5 by withdrawing from the orifice 24 or 25 of the extension of the plate 18. Then the support chassis 5 can be transposed into its other working position. Then when the operating lever 31 is slid downwards on the oblique ramp 32, if the support chassis is situated in the new working position, the spindle 26 engages in the corresponding orifice 24 or 25 and locks the support chassis in this position.

In accordance with an important characteristic of the invention, the connection beam 6 comprises a lever 33 on its extremity directed towards the support chassis 5 of the rotary rake heads 1 and 2. This lever is connected to a link rod 34 which is itself connected to a control lever 35 which actuates a device for reversing the direction of rotation of the rotary rake head 1, when the orientation of the support chassis 5 is modified to transpose it from one working position into the other. The reversing device is disposed in a casing 36 situated on the support chassis 5. It is composed especially of a slide dog 37 and of two bevel pinions 38 and 39, one of which is mounted freely in rotation on a shaft 40 which effects the rotating drive of the rotary rake head 1 and the other of which is mounted rigidly on a shaft 41 which effects the rotating drive of the other rotary rake head 2. These two bevel pinions 38 and 39 are in engagement with a third bevel pinion 42 and are driven by this bevel pinion 42 in opposite directions to one another. The pinion 42 is fast with a stub shaft 43 which extends out of the casing 36 and is driven in a manner known per se from the power take-off shaft of the propelling vehicle. The sliding dog 37 can be displaced longitudinally on the end of the drive shaft 40 by means of the control lever 35. Thus it can be brought into engagement with the one or the other of the bevel pinions 38, 39 which for this purpose possess lateral teeth. During working, the bevel pinion 39 and the drive shaft 41 constantly rotate the rotary rake head 2 in the direction of the arrow F (FIGS. 1, 2). When the sliding dog 37 meshes with the said bevel pinion 39, it drives the shaft 40 on which it is disposed in the same direction of rotation as that of the said pinion 39 (FIG. 3). Thus it causes the rotary rake head 1 to rotate in the direction indicated by the arrow E, which corresponds to the tedding position in which the two rotary rake heads rotate to converge at the front. When the sliding dog 37 meshes with the other bevel pinion 38, it drives the shaft 40 on which it is disposed in the direction of rotation of the said pinion 38 which rotates in the opposite direction to the aforesaid bevel pinion 39. Then through the intermediary of the shaft 40 the sliding dog causes the rotary rake head 1 to rotate in the direction of the arrow F' so that the two rotary rake heads are rotating in the same direction, which corresponds to the windrowing position (FIG. 5).

Thanks to this arrangement, the pivoting of the support chassis 5 about the substantially vertical spindle 10 of the pivot 9 for the transposition from the central tedding position into the lateral windrowing position and vice versa, automatically and simultaneously causes the adjustment of the inclination of the rotation axes 15 and 16 of the rotary rake heads 1 and 2 in relation to the ground and the reversal of the direction of rotation of the rotary rake head 1. These three operations are thus executed in a certain manner and without the need for the carrying out of manual adjustments by means of control elements.

When the sliding dog 37 is actuated it can occur that its teeth are opposite to the lateral teeth of the bevel pinion 38 or 39 with which it is to come into mesh. In order to avoid the control lever 35 exerting a heavy pressure then upon the said dog, a pressure limiter 44 is provided which absorbs the pressure of the link rod 34 and moreover automatically causes the meshing of the sliding dog 37 with the bevel pinion concerned as soon as their teeth can mesh. This limiter 44 comprises especially a compression spring (not shown) disposed between the control lever 35 and a pivot 45 connected to the link rod 34. Thus when the teeth of the sliding dog 37 are opposite to the lateral teeth of the appropriate bevel pinion 38 or 39, in a change of working position, the said compression spring is compressed as a result or the displacement of the link rod 34 and of the pivot 45. Therefore the displacement of the said link rod and of the said pivot has practically no effect upon the sliding dog 37. Furthermore, as soon as the said teeth can mesh, as a result of an angular rotation of the bevel pinion 38 or 39, the compression spring expands and ensures their engagement by displacement of the control lever 35 which actuates the sliding dog 37.

What is claimed is:

1. A combined haymaking machine for central tedding and lateral windrowing, comprising at least two rotary rake heads, a support chassis that interconnects said rake heads, a connection beam extending forward from the chassis, pivot means comprising a substantially vertical spindle which is pivotally mounted on said connection beam and a substantially horizontal spindle which is pivotally mounted on said support chassis and is substantially parallel to said support chassis, and means connected with the said support chassis and connection beam and adapted automatically and simultaneously to cause a pivoting of the support chassis of the rotary rake heads about the substantially horizontal spindle of the said pivot means when the said support chassis is pivoted about the substantially vertical spindle of the said pivot means, in order to modify the orientation of said support chassis in relation to the intended direction of travel of the machine during the transposition from the central tedding position into the lateral windrowing position and vice versa.

2. A haymaking machine according to claim 1, wherein the support chassis of the rotary rake heads comprises a connection arm with a ball joint, and the connection beam comprises a plate pivoted on said connection arm by means of said ball joint.

3. A haymaking machine according to claim 2, wherein the connection arm of the support chassis is situated lower than the substantially horizontal spindle of the pivot means and on the part of the support chassis which pivots to the rear about the substantially vertical spindle of the said pivot means, during the transposition of the machine into the lateral windrowing position.

4. A haymaking machine according to claim 1, wherein the pivot means form an abutment against which the support chassis of the rotary rake heads abuts when it reaches the position for lateral windrowing.

5. A haymaking machine according to claim 1, wherein the pivot means comprises an abutment against which the support chassis of the rotary rake heads is immobilized when it reaches the central tedding position.

6. A haymaking machine according to claim 2, wherein the forward part of the connection arm of the support chassis of the rotary rake heads is slightly angled upward.

7. A haymaking machine according to claim 1, wherein the pivot means comprises a spring bolt engageable in orifices on an extension of a plate fixed to the connection beam, in order to lock the support chassis of the rotary rake heads in relation to the connection beam, in the central tedding position or in the lateral windrowing position.

8. A haymaking machine according to claim 1, comprising a lever fixed to the extremity of the connection beam which is directed toward the support chassis of the rotary rake heads, a link rod connected to said lever and a control lever connected to said link rod, said control lever causing the reversal of the direction of rotation of at least one of the rotary rake heads when the support chassis pivots about the substantially vertical spindle of the pivot means in order to be brought from the central tedding position into the lateral windrowing position and vice versa.

* * * * *